Feb. 2, 1954 H. A. HECKENDORF 2,667,856
VACUUM REGULATING DEVICE FOR PIPE LINE MILKERS
Filed June 2, 1952
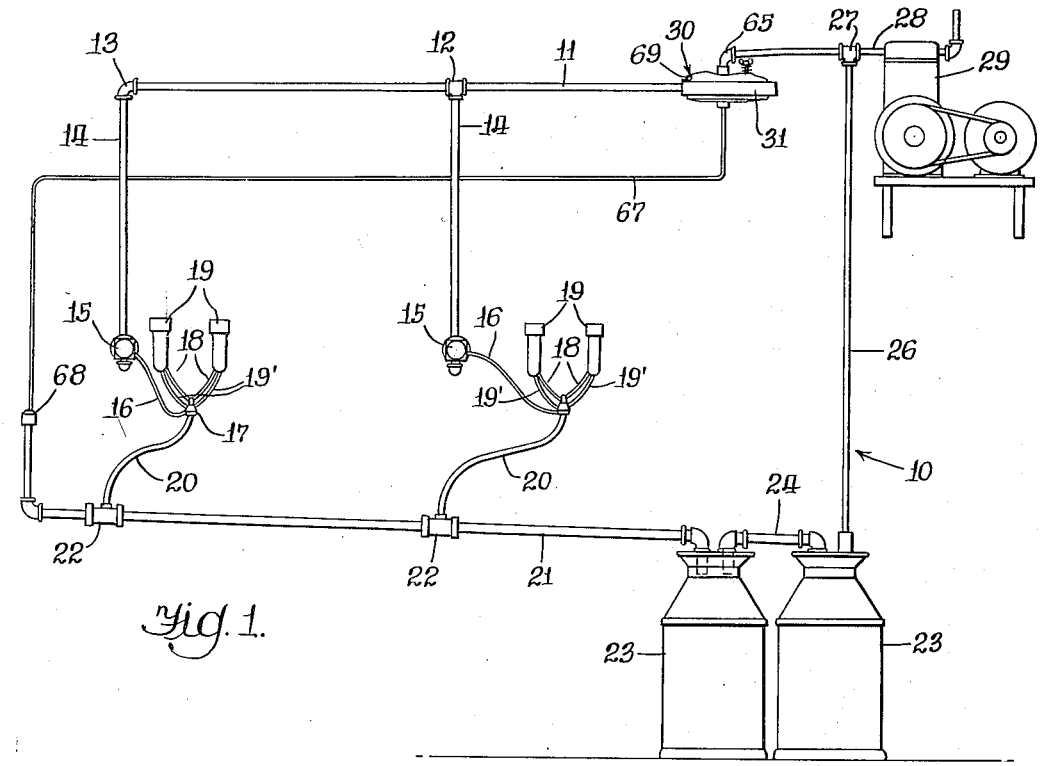
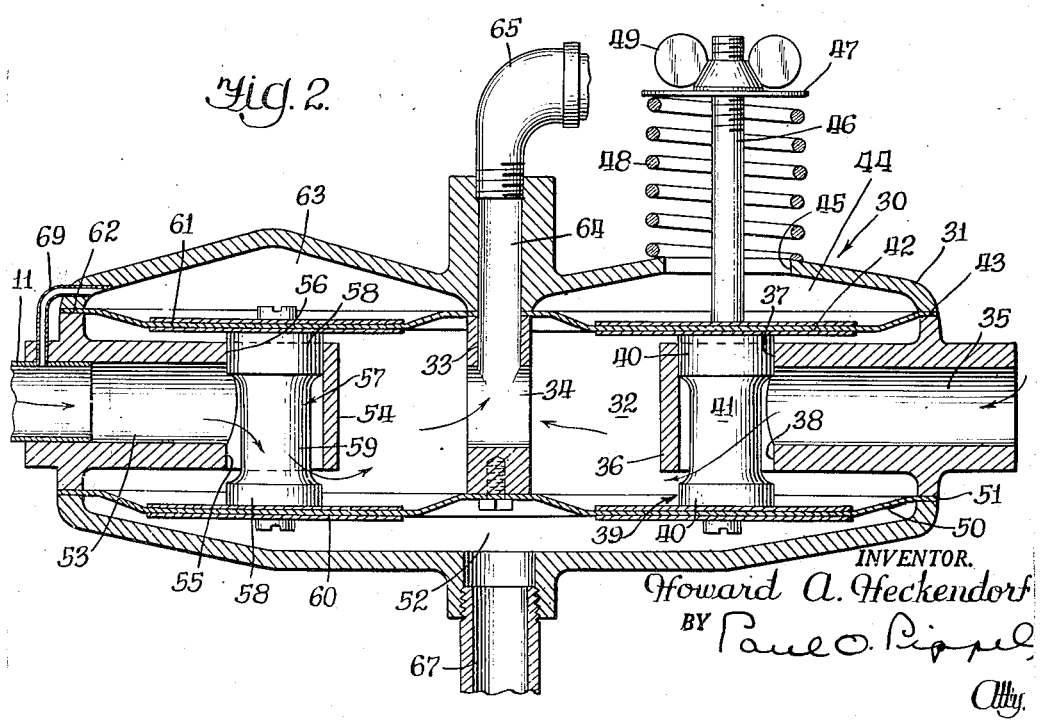
INVENTOR.
Howard A. Heckendorf
BY Paul O. Pippel
Atty.

Patented Feb. 2, 1954

2,667,856

UNITED STATES PATENT OFFICE 2,667,856

VACUUM REGULATING DEVICE FOR PIPE-LINE MILKERS

Howard A. Heckendorf, Chicago, Ill., assignor to International Harvester Company, a corporation of New Jersey Application June 2, 1952, Serial No. 291,190

12 Claims. (Cl. 119—14.44)

This invention relates to an improved pipe-line milking system including a novel regulating device therefor. More specifically this invention relates to a vacuum regulator connected to and remotely operable with respect to the milk receiving line of a pipe-line milking system.

In the conventional pipe-line milking system a milk receiving line is normally connected to a series of milk cans or milk receivers, the cans in turn being connected to a vacuum pump. One end of the milk receiving line is generally connected to a vacuum conduit to which a number of pulsating vacuum and air type of milking machines may be connected. The end of the vacuum conduit is generally connected to a regulator for regulating the vacuum in the conduit. This type of regulator generally includes a mechanism which permits the entrance of air into the vacuum conduit when the vacuum pressure within the conduit has reached a certain predetermined high vacuum. In a system of this type it is, of course, immediately apparent that the air which enters into the vacuum conduit also flows with the milk through the milk receiving line and into the ultimate receiver. Under certain conditions this entrance of the air into the receiver may be objectionable from the standpoint of excessive agitation of the milk which breaks butterfat globules into butter and from the standpoint of possible contamination. It is a prime object of this invention therefore to provide an improved pipe-line milking system having a vacuum regulator which is effective for regulating both the milking machine vacuum and the vacuum in the milk receiving line in a simultaneous and even manner without permitting the entrance of air into the sanitary parts of the piping system.

A still further object is to provide an improved vacuum regulator for milking systems, the regulator being effective to maintain the vacuum in a pulsating conduit at the same vacuum pressure at which the vacuum is maintained within a milk receiving line, the vacuum regulator being so connected to the milk receiving line and the pulsating conduit to prevent the entrance of air into the milk line.

A still further object is to provide a vacuum regulator for milking systems, the vacuum regulator including an air chamber provided with an opening in communication with the atmosphere, the vacuum regulator further including a vacuum chamber which is directly connected to one end of a milk receiving line for the purpose of maintaining a static pressure within the vacuum chamber, the regulator further including a valve which is movable in response to the vacuum within the vacuum chamber for opening and closing the air chamber with respect to the atmosphere whereby a vacuum conduit which is connected to the milk receiving line may be exposed to the atmosphere when the vacuum gets too high.

A still further object is to provide an improved vacuum regulator for a pipe-line milking system, the regulator including a vacuum chamber which is connected to the vacuum pipe-line of the milking system in a manner designed to reflect the vacuum within the system, the regulator including suitable valves which are moved in response to a static vacuum within the vacuum chamber for regulating the vacuum within the pipe-lines of the system.

A more specific object is to provide an improved vacuum regulator for pipe-line milking systems, the regulator including a casing having an air chamber, the air chamber including an air connection adapted to communicate with the atmosphere, the chamber further including a continually closed vacuum chamber which is in communication with the milk delivery line of the system, the air chamber including a first valve which is operable in response to the vacuum within the vacuum chamber for regulating the vacuum within the milk receiving line, the air chamber also including a connection adapted to communicate with a vacuum or pulsating conduit to which a series of pulsators are connected, the connection also including a valve which is movable in response to the vacuum within the vacuum chamber for regulating the vacuum in the pulsators at the same degree of vacuum in response to the vacuum within the vacuum system.

These and further objects will become more readily apparent from a reading of the specification when examined in connection with the accompanying sheet of drawing.

In the drawing:

Fig. 1 is a side elevational view of an improved regulating device connected to a pipe-line milking system; and Fig. 2 is an enlarged cross sectional view through a vacuum regulator utilized in connection with the system shown in Fig. 1.

A pipe-line milking system is generally designated by the reference character 10 as indicated in Fig. 1. The pipe-line milking system 10 includes a first vacuum line 11 to which a plurality of fittings 12 and 13 are connected. The fittings 12 and 13 suitably support and are connected to a pair of riser pipes 14. Conventional type of vacuum pulsators 15 are connected to the ends of the riser pipes 14. An air and vacuum hose 16 is connected to each pulsator 15, the hoses 16 in turn being connected to a milker claw 17. The milker claw 17 is connected to vacuum and air hoses 18 which are connected to teat cups 19. The teat cups 19 are of a conventional type and it is believed unnecessary to describe them in detail. In the conventional type of teat cup construction, a rubber inflation is disposed within a teat cup shell and the air hoses 18 which are shown in the drawing communicate with the space formed between the inner wall of the teat cup shell and the outer wall of the inflation for alternately subjecting the space to vacuum and atmosphere. Hoses 19' are directly connected to the inflations, these hoses being under vacuum and being arranged to direct the milk from the cow to a flexible hose 20 and to a milk receiving line 21.

The hoses 20 direct the milk by means of suitable fittings 22 to the milk receiving line 21. The milk receiving line 21 is connected to one or more milk cans 23, the milk initially flowing to one receiver and upon filling of the first receiver being drawn therefrom to the other receiver by means of a connection 24. The milk receivers 23 are placed under a vacuum by means of a vacuum line 26 which by means of a fitting 27 is connected to a vacuum pump connection 28. The vacuum pump connection 28 is in turn connected to a conventional vacuum pump 29.

As indicated in Figs. 1 and 2, a vacuum or pressure regulator is generally indicated by the reference character 30. The regulator 30 includes a casing 31 which is provided with an air chamber 32. The air chamber 32 is provided with a partition 33 having an opening 34. One end of the casing 31 is provided with an air inlet connection 35 which is in communication with the atmosphere and has at one end a valve sleeve 36. The valve sleeve 36 includes a guide portion 37 at one end and at its other end is formed with a valve seat 38. A spool shaped valve 39 is reciprocally positioned within the valve sleeve 36. The spool valve 39 includes a pair of longitudinally spaced annular lands 40, the upper land 40 being positioned in sliding engagement with the guide portion 37. The lower land 40 of the valve 39 is adapted to seat with respect to the annular valve seat 38 for closing the air inlet connection 35 with respect to the atmosphere. The valve 39 is suitably provided with an annular valley or recessed portion 41 which as indicated in Fig. 2 serves to permit the free flow of air into the air chamber when the valve 39 is positioned as indicated.

The valve 39 is connected at its upper end to a flexible diaphragm 42 which is suitably clamped between portions of the casing as indicated at 43. The diaphragm 42 separates the air chamber 32 from a second air chamber 44 which is continually in communication with the atmosphere by means of an opening 45. A pin 46 is suitably connected to the spool shaped valve 39, this pin having a washer 47 disposed at its upper end and a spring 48 positioned in engagement with the washer and with an upper portion of the casing 31. A wing nut 49 is threaded on the upper end of the pin 46 for suitably adjusting the tension of the spring 48. A diaphragm 50 is suitably connected to the lower end of the spool shaped valve 39, the diaphragm also being suitably supported on the casing as indicated at 51. It must be realized that the casing 31 may be suitably made of a plurality of parts and that the diaphragms can be clamped between adjacent parts in a conventional manner. The flexible diaphragm 50 separates the chamber 32 from the first vacuum chamber 52. One end of the air chamber 32 is provided with a vacuum connection 53 which is suitably connected to the first vacuum line 11. The vacuum connection 53 includes a valve sleeve 54 positioned at one end, the valve sleeve 54 being provided at its lower end with a valve seat 55 and at its upper end with an annular guide portion 56. A spool valve 57 is reciprocally positioned within the valve sleeve 54. The spool valve 57 includes upper and lower lands 58 and an annular recess 59 disposed therebetween. The upper land 58 engages the guide portion 56 in sliding relation and the lower land 58 serves to suitably seal the vacuum connection 53 when the land 58 is in engagement with the valve seat 55. The upper end of the spool valve 57 is connected to a flexible diaphragm 61 which separates the air chamber 32 from a second vacuum chamber 63.

A vacuum connection 64 is centrally disposed on the casing 31, the vacuum connection 64 being in communication with the opening 34 and with a pipe conduit 65, which as indicated in Fig. 1, is in communication by means of the fitting 27, with the second vacuum line 26 and a vacuum pump connection 28. A static conduit 67 is also connected to the casing 31 for communication with the vacuum chamber 52. The static conduit 67 may have a relatively small diameter and is in communication with one end of the milk receiving line 21 as indicated at 68. The static conduit 67 serves to maintain the chamber under the same vacuum depression that exists in the milk receiving line 21 and thus any changes in the vacuum in said receiving line 21 are immediately reflected in the vacuum chamber 52. The second vacuum chamber 63 is in communication with the conduit 11 by means of a conduit 69, as shown in Fig. 2.

In the operation, the vacuum pump 29 serves to place the receiving containers 23 under vacuum by means of the vacuum line 26. The milk receiving line 21 is also under vacuum and the static line 67 provides for the same degree of vacuum in the first vacuum chamber 52. The first vacuum line 11 is placed under a vacuum since the spool valve 57 is in the position shown in Fig. 2 so that communication is had between the first vacuum connection 53 and the pipe conduit 65 by means of the second vacuum connection 64. The pulsators 15, vacuum hose 16, milker claw 17, and vacuum and air hoses 18, function with the teat cups 19 in a conventional manner and milk is drawn from the cow through conduits 20 into the milk receiving line 21 whereupon it is discharged to the first container 23 and upon that container filling it is then drawn through the conduit 24 to the second container 23.

The regulator 30 functions to keep the vacuum in the milk line 21 and in the static line at a certain desired constant vacuum level, this level of course being dependent on the setting of the compression spring 48 by means of the wing nut 49.

When the vacuum in the milk line 21 reaches a higher vacuum level than desired this change is immediately reflected in line 67 and chamber 52. The atmospheric pressure on diaphragm 42 now pushes the spool valve 39 downwardly against the action of the spring 48 whereupon the lower land 40 is out of engagement with the annular valve seat 38 and air is free to flow through the air conduit 35 into the air chamber 32. This air then flows through the opening 34 into the vacuum connection 64 into the pipe conduit 65. The effect of this air flow is, of course, to open the vacuum pump connection 28 and pump 29 to the atmosphere whereupon the pump 29 pulls a lower vacuum on the second pipe-line 26 and thus there is an immediate decrease in the vacuum within the receiving containers 23 and the milk receiving line 21. By the term "high vacuum" is meant a greater exhaustion within a chamber, whereas "low vacuum" is meant a lesser exhaustion of a chamber. As the milk receiving line 21 thus is placed in a condition wherein the vacuum is less or low, this change is again immediately reflected in the chamber 52 and in view of this lower vacuum the spring 48 is effective to pull the spool valve 39 upwardly in position wherein the air opening 35 is closed and the air flow into the chamber 32 ceases. Thus again the vacuum pump 29 is fully effective to maintain and place the second vacuum line 26 under a higher vacuum pull thus increasing the vacuum until the desired point of operation is again reached. It is of prime importance to note that the air which enters into the receiving chamber 32 is pulled directly to the vacuum pump 29 and does not in any manner whatsoever flow into the milk receiving line 21. Thus the vacuum is properly controlled within the milk receiving line 21 without the entrance of air into any part of the sanitary conduit. Thus contamination and agitation of the milk by air is prevented.

As previously indicated above it is of maximum importance to maintain the first vacuum line 11 at the same degree of vacuum that is present in the milk receiving line 21. This is accomplished by the vacuum regulator 30 in the following manner. Since the vacuum in the chamber 52 is common to both spool valves 39 and 57 the latter will operate to maintain the same vacuum in line 11 as there is in pipe-line 67. The maintenance of equal vacuum in the line 11 is accomplished in the following manner: When the chamber 63 is under the same vacuum as the chamber 52 the spool valve 57 is maintained in a balanced position and the lower land 58 is in seating engagement with the annular valve seat 55 to close the connection 53 with respect to the air chamber 32. The conduit 69 which is in communication with the first vacuum line 11 and the chamber 63 serves to reflect the vacuum present in the line 11 and when the pressure within chamber 63 is equal to the pressure within chamber 52 the closed position of the valve is apparent. As long as the pressure within the chambers 63 and 52 is balanced the spool valve 57 will be in the closed position. Supposing however now that there is a lower vacuum in the chamber 63 occasioned by the fact that the vacuum in the line 11 has decreased, the low vacuum in the chamber 63, compared to 52, is now effective to draw the spool valve 57 downwardly whereupon the land 58 is out of engagement with the valve seat 55. The vacuum connection 53 is now in communication with the chamber 32, the connection 64, and the pipe 65 leading to the vacuum pump 29. The vacuum pump 29 is thereupon effective to pump air from the vacuum connection until the vacuum in the pipe-line 11 is again increased or heightened to the desired degree in balance with respect to the chamber 52 and the vacuum contained within the milk receiving line 21. When the vacuum is again balanced between chambers 52 and 63 the spool valve 57 returns to its closed position and the desired vacuum is maintained within the line 11.

Thus it can be seen that the chamber 52 which is common to both the of the valves 39 and 57 serves to control the vacuum in such a manner that the same vacuum is maintained in both lines 11 and 21. It is of course obvious that by tightening the wing nut 49 or by loosening the same the tension of the spring 48 may be adjusted which of course in turn will determine the predetermined desired vacuum necessary to actuate the spool valves. Air which is exhausted from the line 11 is air which enters through the pulsators 15 during their conventional operation.

It can thus be seen that an improved milking system of the pipe-line type has been provided, this system including the improved remote vacuum regulator which is so constructed that proper and balanced vacuum can be maintained on both the milk receiving line and the vacuum line without the entrance of air into the milk pipe-line.

It can now be seen that the objects of the invention having been fully achieved and it must be understood that changes and modifications may be made without departing from the spirit of the invention as disclosed nor the scope thereof as defined in the appended claims.

What is claimed is:

1. In a pipe-line milking system having a first vacuum line, a pulsator connected to said first vacuum line, a teat cup cluster connected to said pulsator, a milk receiving line, conduit means connecting said milk receiving line to said teat cup cluster, a milk receiver connected to said receiving line, a second vacuum line connected to said milk receiver, and means connecting said first and second vacuum lines to a source of vacuum; a vacuum regulator comprising a casing, a first air chamber within said casing, a first vacuum connection in communication with said first air chamber, said first vacuum connection being adapted to communicate with said second vacuum line, an air connection adapted to communicate with said first air chamber, a first movable valve in said first air chamber, a pair of first diaphragms connected to said valve and to the casing providing a first vacuum chamber and a second air chamber in communication with the atmosphere, said first valve being movable in one direction in response to movement of said diaphragms for closing said air connection with respect to said first air chamber and said first vacuum connection, adjustable resilient means connected to said first valve for moving said first valve in a second direction to open said air connection, a second movable valve in said casing, a pair of second diaphragms connected to said second valve and to said casing, one of said diaphragms being disposed between the first air chamber and said first vacuum chamber, a second vacuum chamber adjacent the other of said second diaphragms, a second vacuum connection on said casing and adapted to provide for communication between said first vacuum line and said first air chamber, first conduit means connecting said second vacuum connection with said second vacuum chamber, said second valve being movable to close said second vacuum connection from the first air chamber during a vacuum equalization between said second vacuum chamber and said first vacuum chamber, and to open said second vacuum connection to said first air chamber during a vacuum differential between said first vacuum chamber and said second vacuum chamber, and means adapted to connect said first vacuum chamber to one end of said milk receiving line, said means including a second conduit having a lesser flow capacity than said receiving line.

2. In a pipe-line milking system having a first vacuum line, a pulsator connected to said first vacuum line, a teat cup cluster connected to said pulsator, a milk receiving line, a conduit means connecting said milk receiving line to said teat cup cluster, a milk receiver connected to said receiving line, a second vacuum line connected to said milk receiver, and means connecting said first and second vacuum lines to a source of vacuum; a vacuum regulator comprising a casing, a first air chamber within said casing, a first vacuum connection in communication with said first air chamber, said vacuum connection being adapted to communicate with said second vacuum line, an air connection adapted to communicate with said first air chamber, a first movable valve in said first air chamber, a pair of first diaphragms connected to said valve and to the casing providing a first vacuum chamber and a second air chamber in communication with the atmosphere, said first valve being movable in one direction in response to movement of said diaphragms for closing said air connection with respect to said first air chamber and said first vacuum connection, biasing means connected to said valve for moving said valve in a second direction to open said air connection, a second movable valve in said casing, a pair of second diaphragms connected to said casing, one of said diaphragms being disposed between the first air chamber and said first vacuum chamber, a second vacuum chamber adjacent the other of said second diaphragms, a second vacuum connection on said casing and adapted to provide for communication between said first vacuum line and said first air chamber, first conduit means connecting said second vacuum connection with said second vacuum chamber, said second valve means being movable to close said second vacuum connection from the first air chamber during a vacuum equalization between said second vacuum chamber and said first vacuum chamber, and to open said second vacuum connection to said first air chamber during a vacuum differential between said first vacuum chamber and said second vacuum chamber, and second conduit means adapted to connect said first vacuum chamber to one end of said milk receiving line.

3. In a pipe-line milking system having a first vacuum line, a milk receiving line, a milk receiver connected to said receiving line, a second vacuum line connected to said milk receiver, and means connecting said first and second vacuum lines to a source of vacuum; a vacuum regulator comprising a casing, an air chamber within said casing, a first vacuum connection in communication with said air chamber, said vacuum connection being adapted to communicate with said second vacuum line, an air connection adapted to communicate with said air chamber, a first movable valve in said air chamber, a pair of first diaphragms connected to said valve and to the casing providing a first vacuum chamber, said first diaphragms being movable in one direction in response to a high vacuum within said first vacuum chamber, said first valve being movable in said first direction in response to movement of said diaphragms for opening said air connection with respect to said air chamber and said first vacuum connection, means connected to said first valve for moving said first valve in a second direction in response to a lower vacuum within said first vacuum chamber to close said air connection with respect to said first vacuum connection, a second movable valve in said casing, a pair of second diaphragms connected to said second valve and to said casing, one of said diaphragms being disposed between the air chamber and said first vacuum chamber, a second vacuum chamber adjacent the other of said second diaphragms, a second vacuum connection on said casing and adapted to provide for communication between said first vacuum line and said air chamber, first conduit means connecting said second vacuum connection with said second vacuum chamber, said second valve means being movable to close said second vacuum connection from the air chamber during a vacuum equalization between said second vacuum chamber and said first vacuum chamber, and to open said second vacuum connection to said air chamber during a vacuum differential between said first vacuum chamber and said second vacuum chamber, and second conduit means adapted to connect said first vacuum chamber to one end of said milk receiving line.

4. In a pipe-line milking system having a first vacuum line, a milk receiving line, a milk receiver connected to said receiving line, a second vacuum line connected to said milk receiver, and means connecting said first and second vacuum lines to a source of vacuum; a vacuum regulator comprising a casing, an air chamber within said casing, a first vacuum connection in communication with said air chamber, said first vacuum connection being adapted to communicate with said second vacuum line, an air connection adapted to communicate with said air chamber, a first movable valve in said air chamber, a diaphragm connected to said first valve and to the casing providing a first vacuum chamber, said diaphragm being movable in one direction in response to a high vacuum within said first vacuum chamber, said first valve being movable in said first mentioned direction in response to movement of said diaphragm for opening said air connection with respect to said air chamber and said first vacuum connection, means connected to said valve for moving said valve in a second direction in response to a lower vacuum within said first vacuum chamber to close said air connection with respect to first vacuum connection, a second movable valve in said casing, a pair of diaphragms connected to said second valve and to said casing, one of said diaphragms being disposed between the air chamber and said first vacuum chamber, a second vacuum chamber adjacent said other diaphragm of the pair, a second vacuum connection on said casing and adapted to provide for communication between said first vacuum line and said air chamber, first conduit means connecting said second vacuum connection with said second vacuum chamber, said pair of diaphragms and said second valve means being movable to close said second vacuum connection from the air chamber during a vacuum equalization between said second chamber and said first vacuum chamber, and to open said second vacuum connection to said air chamber during a vacuum differential between said first vacuum chamber and said second vacuum chamber, and second conduit means adapted to connect said first vacuum chamber to one end of said milk receiving line.

5. In a pipe-line milking system having a first vacuum line, a pulsator connected to said vacuum line, a teat cup cluster connected to said pulsator, a milk receiving line, conduit means connecting said milk receiving line to said teat cup cluster, a milk receiver connected to said receiving line, a second vacuum line connected to said milk receiver, and means connecting said first and second vacuum lines to a source of vacuum; a vacuum regulator comprising a casing, an air chamber within said casing, a first vacuum connection in communication with said air chamber, said vacuum connection being adapted to communicate with said second vacuum line, an air connection adapted to communicate with said air chamber, a first movable valve in said air chamber, a first vacuum chamber in said casing, said first valve being movable in a first direction in response to a high vacuum within said first vacuum chamber for opening said air connection with respect to said first air chamber and said first vacuum connection, means connected to said valve for moving said valve in a second direction in response to a lower vacuum within said first vacuum chamber to close said air connection with respect to said first vacuum connection, a second movable valve in said casing, a pair of diaphragms connected to said second valve and to said casing, one of said diaphragms being disposed between the air chamber and said first vacuum chamber, a second vacuum chamber adjacent said other of said pair of diaphragms, a second vacuum connection on said casing and adapted to provide for communication between said first vacuum line and said air chamber, first conduit means connecting said second vacuum connection with said second vacuum chamber, said pair of diaphragms and said second valve means being movable to close said second vacuum connection from the air chamber during a vacuum equalization between said second vacuum chamber and said first vacuum chamber, and to open said second vacuum connection to said air chamber during a vacuum differential between said first vacuum chamber and said second vacuum chamber, and second conduit means adapted to connect said first vacuum chamber to one end of said milk receiving line.

6. In a pipe-line milking system, a milk receiver, a milk receiving line connected to said milk receiver, a vacuum conduit connected to said milk receiver, said vacuum conduit being in communication with a constant source of vacuum and means connected with said receiving line for supplying milk to said receiving line; a vacuum regulator comprising a casing, a first air chamber within said casing, an air connection in said casing adapted to provide for the inlet of air to said first air chamber, a valve structure on said casing, said valve structure including a valve seat associated with said air connection, a movable valve engageable with said valve seat, a vacuum chamber in said casing, a second air chamber in said casing in constant communication with the atmosphere, a first diaphragm connected to said valve for separating said first air chamber from said second air chamber, a second diaphragm connected to said valve for separating said first air chamber from said vacuum chamber, said second diaphragm being movable in one direction during a predetermined high vacuum within said vacuum chamber for moving said valve in one direction out of engagement with said valve seat for opening said air connection, biasing means connected to said valve for urging said valve in a second direction during a lower vacuum in said vacuum chamber to close said air connection, and a conduit connecting said receiving line with said vacuum chamber.

7. In a pipe-line milking system having a first vacuum line, a pulsator connected to said vacuum line, a teat cup cluster connected to said pulsator, a milk receiving line, conduit means connecting said milk receiving line to said teat cup cluster, a milk receiver connected to said receiving line, a second vacuum line connected to said milk receiver, and means connecting said first and second vacuum lines to a source of vacuum; a vacuum regulator comprising a casing, an air chamber within said casing, a first vacuum connection in communication with said air chamber, said first vacuum connection communicating with said second vacuum line, an air connection communicating with the air chamber and the atmosphere, a first valve associated with said air connection for opening and closing the same, a first vacuum chamber in said casing, a first conduit means connecting said first vacuum chamber with said milk receiving line, said first valve being movable in response to a predetermined high vacuum in said first vacuum chamber for opening said air connection with respect to said air chamber, said first valve being movable to close said air connection during a lower vacuum in said first vacuum chamber, a second vacuum connection on said casing adapted to communicate with said air chamber, said second vacuum connection being connectible to said first vacuum line, a second vacuum chamber on said casing, a second conduit means communicating with said second vacuum connection and said second vacuum chamber, a second movable valve associated with said second vacuum connection, said second valve being movable in response to a vacuum equalization between said second vacuum chamber and said first vacuum chamber to close said second vacuum connection with respect to said air chamber, said second valve being movable to open said second vacuum connection in response to a vacuum differential between said first and second vacuum chambers.

8. In a pipe-line milking system having a first vacuum line, a pulsator connected to said first vacuum line, a teat cup cluster connected to said pulsator, a milk receiving line, conduit means connecting said milk receiving line to said teat cup cluster, a milk receiver connected to said receiving line, a second vacuum line connected to said milk receiver, and means connecting said first and second vacuum lines to a source of vacuum; a vacuum regulator comprising a casing, an air chamber within said casing, a first vacuum connection in communication with said air chamber, said first vacuum connection communicating with one of said vacuum lines, an air connection communicating with the air chamber and the atmosphere, a first valve associated with said air connection for opening and closing the same, a first vacuum chamber in said casing, a first conduit means connecting said first vacuum chamber with said milk receiving line, said first valve being movable in response to a predetermined high vacuum in said first vacuum chamber for opening said air connection with respect to said air chamber, said first valve being movable to close said air connection during a lower vacuum in said first vacuum chamber, a second vacuum connection on said casing adapted to communicate with said air chamber, said second vacuum connection being connectible to the other of said vacuum lines, a second vacuum chamber on said casing, a second conduit means communicating with said second vacuum connection and said second vacuum chamber, a second movable valve associated with said second vacuum connection, said second valve being movable in response to a vacuum equalization between said second vacuum chamber and said first vacuum chamber to close said second vacuum connection with respect to said air chamber, said second valve being movable to open said second vacuum connection in response to a pressure differential between said first and second vacuum chambers.

9. In a pipe-line milking system having a vacuum line, a milk receiving line, a milk receiver connected to said receiving line, and means connecting said vacuum line to a source of vacuum; a vacuum regulator comprising a casing, an air chamber within said casing, a vacuum connection in communication with said air chamber, said vacuum connection communicating with said vacuum line, an air connection communicating with the air chamber and the atmosphere, a valve associated with said air connection for opening and closing the same, a vacuum chamber in said casing, and a conduit means connecting said vacuum chamber with said milk receiving line, said valve being movable in response to a predetermined high vacuum in said vacuum chamber for opening said air connection with respect to said air chamber, said valve being movable to close said air connection during a relatively lower vacuum in said vacuum chamber.

10. In a pipe-line milking system, a milk receiver, a milk receiving line connected to said milk receiver, a vacuum line connected to said receiver, said vacuum line being in communication with a vacuum pump, and means connected with said receiving line for supplying milk to said receiving line; a vacuum regulator comprising a casing having a vacuum chamber, an air chamber on said casing, an air connection communicating with said air chamber and the atmosphere, a vacuum connection connecting the air chamber and adapted to connect to the vacuum line, a valve for opening and closing said air connection with respect to said air chamber, and a vacuum conduit adapted to connect said milk receiving line with said vacuum chamber, whereby during a certain high vacuum within said vacuum chamber said valve moves to open said air connection and air moves to said air chamber and said vacuum connection, and means connected to said valve for moving the same to close said air connection during a relatively lower vacuum within said vacuum chamber.

11. In a pipe-line milking system including a milk receiver, a milk receiving line connected to said milk receiver, a vacuum line connected to said receiver, a vacuum pump connected to said vacuum line, and means connected to said receiving line for delivering milk to said milk receiving line, the combination therewith of a vacuum regulator comprsing a casing, an air chamber on said casing, a vacuum chamber on said casing, an air connection in communication with the atmosphere and said air chamber, a vacuum connection in communication with the air chamber and said vacuum line, a conduit connected to said milk receiving line and said vacuum chamber, and a movable valve between said air connection and the atmosphere, said valve being movable in response to a high vacuum in said vacuum chamber to open said air connection whereupon air is pumped through said vacuum connection and a drop in the vacuum in said vacuum line takes place, said valve being movable in response to a relatively lower vacuum in said vacuum chamber to close said air connection whereupon the vacuum within the vacuum line is increased.

12. In a pipe-line milking system including a first vacuum line, teat cups connected to said first vacuum line, a milk receiver, a milk receiving line in communication with said milk receiver, a second vacuum line in communication with said milk receiver, a vacuum pump connected to said first and second vacuum lines and means connected to said receiving line for delivering milk from the teat cups to said milk receiving line; the combination therewith of a vacuum regulator comprising a casing, an air chamber associated with said casing, a vacuum chamber associated with said casing, an air connection in communication with the atmosphere and said air chamber, a first vacuum connection in communication with said second vacuum line and said pump, a second vacuum connection adapted to provide for communication between said air chamber and said first vacuum line, a conduit connecting said milk receiving line with said vacuum chamber, a first movable valve between said air connection and the atmosphere, said first valve being movable in response to a high vacuum in said vacuum chamber to open said air connection whereby air is pumped through said first vacuum connection and the vacuum is lowered in said second vacuum line, said first valve being movable in response to a relatively lower vacuum in the vacuum chamber to close said air connection with respect to said first vacuum connection whereupon the vacuum within the second vacuum line is increased, and a second movable valve between said second vacuum connection and said air chamber, said second valve being movable in response to a predetermined vacuum within said vacuum chamber to close said second vacuum connection with respect to said air chamber and said vacuum pump.

HOWARD A. HECKENDORF.

References Cited in the file of this patent

UNITED STATES PATENTS

| Number | Name | Date |
|---|---|---|
| 784,780 | Burrell | Mar. 14, 1905 |
| 1,358,987 | Prince | Nov. 16, 1920 |
| 1,533,187 | Hapgood | Apr. 14, 1925 |